(12) United States Patent
Vaccaro

(10) Patent No.: US 9,306,380 B2
(45) Date of Patent: Apr. 5, 2016

(54) GROMMET FOR CABLE HANGER

(71) Applicant: CommScope Technologies LLC, Hickory, NC (US)

(72) Inventor: Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 127 days.

(21) Appl. No.: 14/081,631

(22) Filed: Nov. 15, 2013

(65) Prior Publication Data
US 2015/0047147 A1 Feb. 19, 2015

Related U.S. Application Data

(60) Provisional application No. 61/865,341, filed on Aug. 13, 2013.

(51) Int. Cl.
*H02G 3/02* (2006.01)
*H02G 3/32* (2006.01)

(52) U.S. Cl.
CPC .. *H02G 3/32* (2013.01); *Y10T 16/05* (2015.01)

(58) Field of Classification Search
None
See application file for complete search history.

(56) References Cited

U.S. PATENT DOCUMENTS

| | | | | |
|---|---|---|---|---|
| 5,443,232 A | * | 8/1995 | Kesinger et al. | 248/62 |
| 5,645,456 A | | 7/1997 | Petersen et al. | |
| 5,675,124 A | * | 10/1997 | Stough et al. | 174/656 |
| 5,739,468 A | * | 4/1998 | Rossman | H02G 3/22 |
| | | | | 174/153 G |
| 5,806,140 A | * | 9/1998 | Carlson | G02B 6/4452 |
| | | | | 16/2.1 |
| 6,354,543 B1 | | 3/2002 | Paske | |
| 6,443,402 B1 | | 9/2002 | Ferrill et al. | |
| 6,897,380 B2 | | 5/2005 | Sakata et al. | |
| 2013/0164975 A1 | * | 6/2013 | Blake | H01R 13/652 |
| | | | | 439/578 |

FOREIGN PATENT DOCUMENTS

| | | |
|---|---|---|
| JP | 2011/223756 | 4/2011 |
| JP | 2012/235576 | 11/2012 |

OTHER PUBLICATIONS

International Search Report and Written Opinion for Corresponding PCT Application No. PCT/US2014/049905, Date of mailing Nov. 18, 2014, 9 pages.

* cited by examiner

*Primary Examiner* — Daniel Petkovsek
(74) *Attorney, Agent, or Firm* — Myers Bigel & Sibley, P.A.

(57) ABSTRACT

A grommet adapted for insertion into a cable hanger includes a generally C-shaped main body formed of a polymeric material and having a longitudinal axis. Such a grommet can be securely held by a cable hanger.

8 Claims, 4 Drawing Sheets

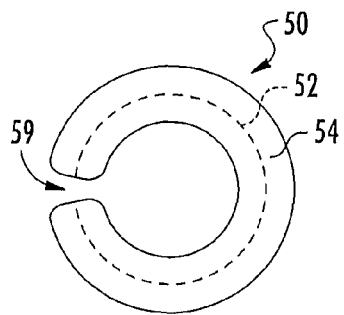
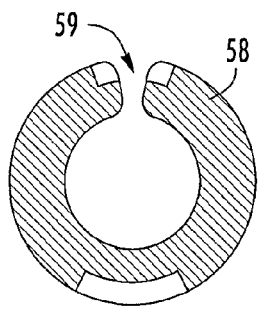
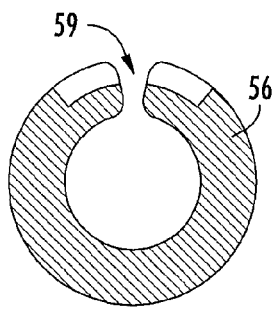
FIG. 6A  FIG. 6B  FIG. 6C
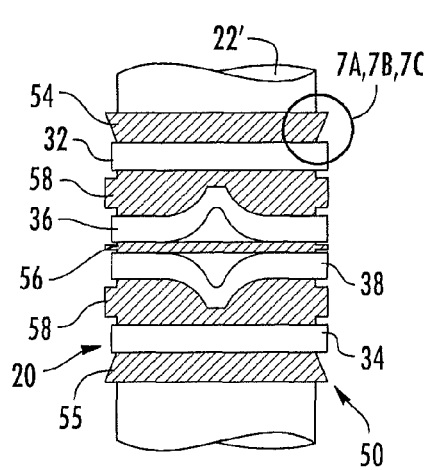
FIG. 7
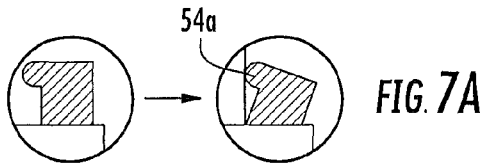
FIG. 7A
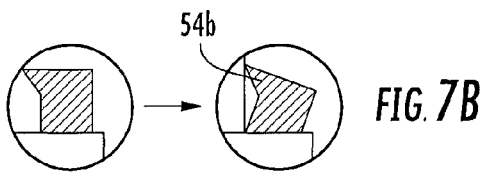
FIG. 7B
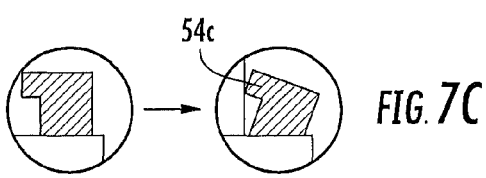
FIG. 7C
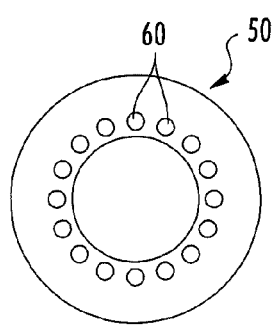
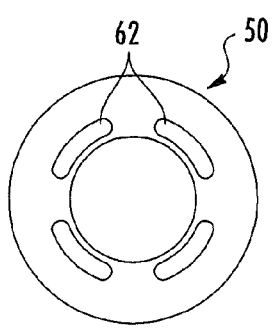
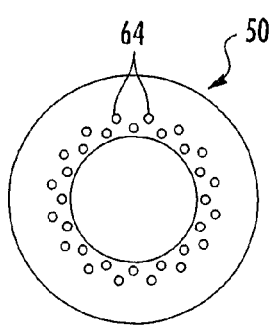
FIG. 8A  FIG. 8B  FIG. 8C

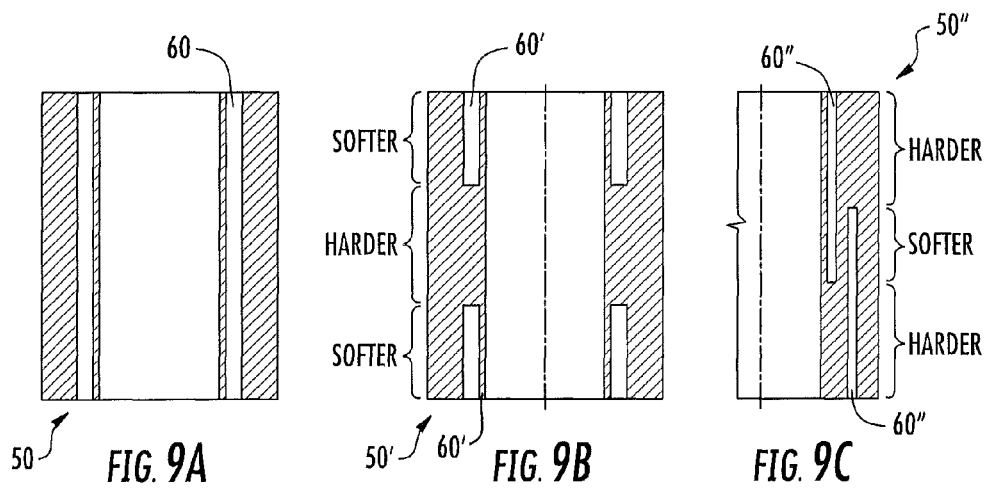
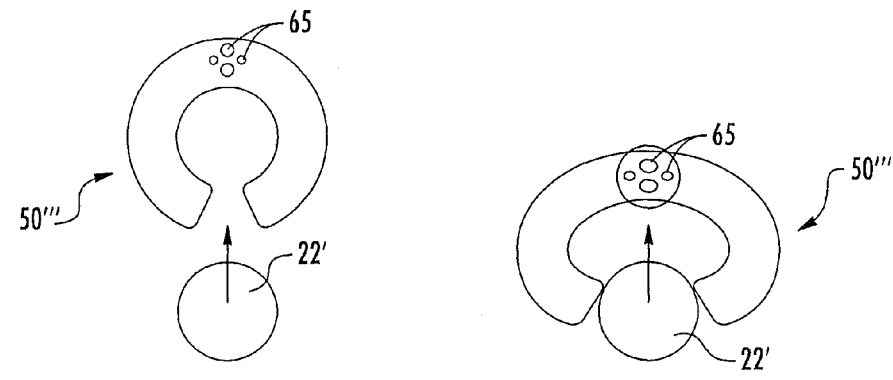
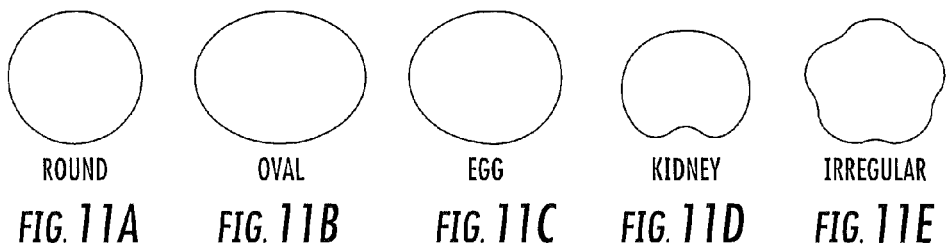

GROMMET FOR CABLE HANGER

RELATED APPLICATION

The present application claims priority from and the benefit of U.S. Provisional Patent Application No. 61/865,341, filed Aug. 13, 2013, the disclosure of which is hereby incorporated herein in its entirety.

FIELD OF THE INVENTION

The present invention relates generally to components for antenna towers, and more particularly to components for mounting cables to antenna towers.

BACKGROUND

Until recently, antenna towers have typically employed RF coaxial cables for power and/or signal communications. Such cables are often mounted to the tower via cable hangers, which capture the cable and mount it to the tower. One popular variety of cable hanger is a "stackable" hanger, which has the capacity to mount via snap latches to another hanger, thereby enabling multiple cables to be mounted in a "stack"; an exemplary stackable hanger is the EZS hanger, available from Andrew, Inc. (Joliet, Ill.). Snap-in hangers are often desirable due to their ease of use, although cable hangers that are not stackable are often employed also.

Operators have begun to replace traditional RF cables on towers with fiber optic and/or hybrid fiber/power cables. These new cables (especially the hybrid styles) can have a slightly irregular shape; exemplary irregular shapes (e.g., oval, elliptical, egg-shaped, kidney and non-descript irregular) are shown in FIGS. 11A-11E. Also, fiber optic and hybrid fiber/power cables are typically heavy (in some instances three to four times the weight per unit length of traditional RF cable). In addition to being of a slightly irregular shape, the diameter over-jacket (DOJ) of a cable can be vastly different from traditional RF cables.

As a result, in practice some operators use standard hangers in combination with grommets to hang fiber or hybrid fiber cable. The grommets are a fairly soft polymer (EPDM, nylon, or the like). The outer diameter of the grommet mimics the RF cable size in order to fit in the hanger, whereas the inner diameter is configured to grip the fiber/hybrid fiber cable. In some grommets, multiple holes are included to accommodate multiple cables (fiber, power, signal, etc.). However, the grommets may be sized poorly for the cables they receive and/or may slip from the hanger. As such, modifications to improve the holding of cables via such grommets may be desirable.

SUMMARY

As a first aspect, embodiments of the invention are directed to a grommet adapted for insertion into a cable hanger. The grommet comprises: a generally C-shaped main body formed of a polymeric material and having a longitudinal axis; and at least one rib projecting radially outwardly from the main body generally normal to the longitudinal axis. Such a grommet can be securely held by a cable hanger, with the rib providing additional stability to the gripping of the grommet by the cable hanger.

As a second aspect, embodiments of the invention are directed to a grommet adapted for insertion into a cable hanger. The grommet comprises a generally C-shaped main body formed of a polymeric material and having a longitudinal axis. The main body includes a plurality of apertures extending generally parallel to a longitudinal axis of the main body. The plurality of apertures can impact the flexibility and/or hardness of the grommet, which can improve its ability to receive and/or capture and hold a cable.

As a third aspect, embodiments of the invention are directed to A grommet adapted for insertion into a cable hanger, comprising: a generally C-shaped main body formed of a polymeric material and having a longitudinal axis; and upper and lower flanges that extend radially outwardly from the main body. At least one of the upper and lower flanges includes a protrusion that extends radially inwardly. Such a protrusion can provide additional stability and security when the grommet is grasped by a cable hanger.

Any of the grommets noted above may be employed with a cable hanger that grasps the grommet within a cavity thereof. Also, the grommets may hold a cable therein, such as a power cable or hybrid power/fiber cable.

BRIEF DESCRIPTION OF THE FIGURES

FIG. 6A is a top view of the grommet of FIG. 4.

FIG. 6B is a section view taken along lines A-A of FIG. 5.

FIG. 6C is a section view taken along lines B-B of FIG. 5.

FIG. 7 is a side view of the grommet of FIG. 4 residing within the hanger of FIG. 2 and holding a fiber optic cable.

FIGS. 7A-7C are enlarged partial side section views of grommet ribs showing how they expand radially when positioned within the hanger.

FIGS. 8A-8C are top views of alternative embodiments of the grommet of FIG. 4 showing different aperture patterns near the inner diameter.

FIGS. 9A-9C are section views of alternative embodiments of the grommet of FIG. 4 showing the depth of apertures such as those shown in FIGS. 8A-8C.

FIGS. 10A and 10B are top views of an alternative embodiment of the grommet of FIG. 4 showing a relaxed condition prior to cable insertion (FIG. 10A) and a flexed condition during cable insertion (FIG. 10B).

FIGS. 11A-E are schematic illustrations of exemplary cross-sectional profiles of fiber optic and hybrid fiber/power cable.

DETAILED DESCRIPTION

Figure 1:
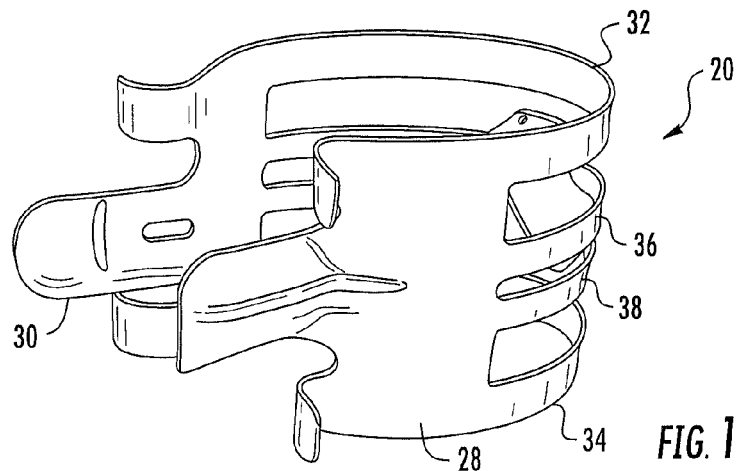
FIG. 1 is a perspective view of a prior art cable hanger.

The present invention is not limited to the illustrated embodiments discussed below; rather, these embodiments are intended to fully and completely disclose the invention to those skilled in this art. In the drawings, like numbers refer to like elements throughout.

In the description below, spatially relative terms, such as "top," "bottom," "side," "upper," "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

All of the below-described embodiments may be combined in any way to provide a plurality of additional embodiments.

Figure 2:
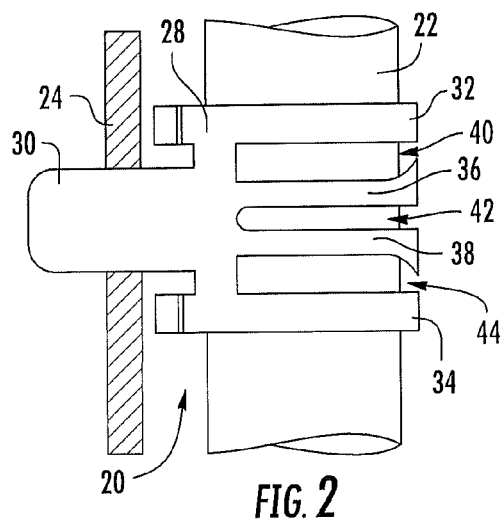
FIG. 2 is a side view of the cable hanger of FIG. 1 with a typical RF cable held therein.
Figure 3:
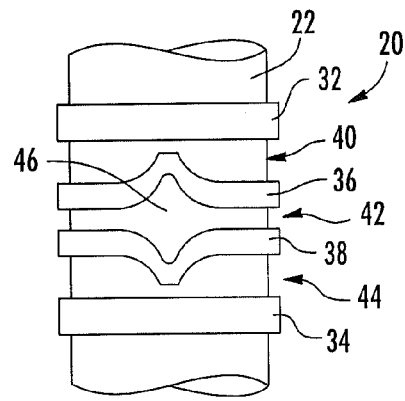
FIG. 3 is a front view of the cable hanger and cable of FIG. 2.
Figure 4:
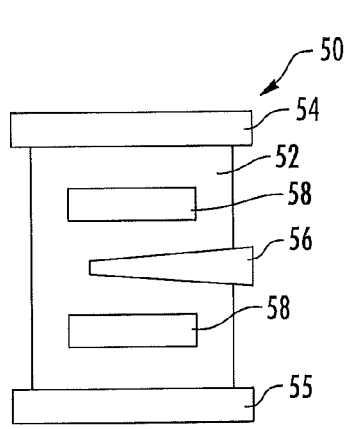
FIG. 4 is a side view of a grommet for insertion into the cable hanger of FIG. 1.
Figure 5:
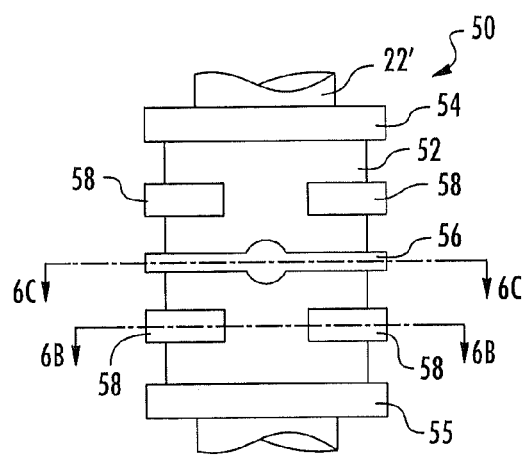
FIG. 5 is a front view of the grommet of FIG. 4 with a fiber optic cable held therein.

Referring now to the figures, FIGS. 1-3 illustrate a cable hanger 20 suitable for mounting a cable 22 (typically an RF cable) to a foundation structure such as an antenna tower ladder 24 or the like. The cable hanger 20 includes a generally C-shaped main body 28 with latches 30 extending away from the free ends of the main body 28. The main body 28 includes upper and lower strips 32, 34 and two central strips 36, 38, between which three gaps 40, 42, 44 are formed. The central strips 36, 38 separate from each other in their central portions, thereby forming a generally diamond-shaped space 46 (see FIG. 3).

As can be seen in FIG. 2, the cable hanger 20 grips the cable 22 with the arms of the main body 28. The cable hanger 20 is typically dimensioned to receive a cable 22 having an outer diameter of between about 0.5 and 3 inches. The cable hanger 20 is mounted to the foundation structure via the latches 30.

The cable hanger 20 is typically formed of a metallic material, such as stainless steel. Additional discussion of cable hangers is set forth in U.S. Pat. No. 6,443,402, the disclosure of which is hereby incorporated by reference herein in its entirety. Other cable hangers, such as stackable cable hangers like those described in U.S. Pat. No. 6,354,543, may also be suitable for use.

Referring now to FIGS. 4-6C, a grommet, designated broadly at 50, is illustrated therein. The grommet 50 includes a generally C-shaped main body 52, two flanges 54, 55 that protrude radially outwardly from the ends of the main body 52, a central rib 56 that extends radially outwardly over approximately half of the circumference of the main body 52, and two pairs of ribs 58 that extend radially outwardly on opposite sides of the main body 52. A gap 59 is present between the free ends of the main body 52 to enable a cable to be inserted therein.

The main body 52 is typically sized such that its outer diameter fits snugly within a cable hanger 20, and thus may be slightly larger than the inner diameter of the cable hanger 20. The inner diameter of the main body 52 is sized to capture a cable 22; in some embodiments, the inner diameter of the main body is between about 7/16 and 2.5 inches.

The grommet 50 is typically formed of a polymeric material. The material of the grommet 50 should be selected to enable the main body 52 of the grommet 50 to flex so that the gap 59 increases to allow a cable 22' to be inserted and captured within the main body 52. Exemplary materials include EPDM and nylon.

As can be seen in FIG. 7, the grommet 50 (as it holds a cable 22') can be inserted between the latches 30 of the cable hanger 20. The cable hanger 20 captures the grommet 50 such that the central rib 56 fits within the gap 42, the ribs 58 fit within gaps 40, 44, one flange 54 fits above the upper strip 32, and the other flange 55 fits below the lower strip 34. This arrangement snugly secures the grommet 50 (and, in turn, the cable 22') for mounting to the antenna tower ladder 24.

Those skilled in this art will recognize that the grommet 50 may have more or fewer ribs (which may depend on the configuration of the cable hanger being used), or may lack ribs entirely.

Referring now to FIGS. 7A-7C, the flanges 54, 55 of the grommet 50 may be formed with radially inwardly-extending protrusions. Such protrusions force the distal ends of the flanges 54, 55 to deflect radially outwardly when a cable 22 is inserted into the grommet 50; this "swelling" of the flanges 54, 55 in turn improves the integrity of the grip between the grommet 50 and the cable hanger 20. FIG. 7A shows the protrusion as a rounded nub 54a, FIG. 7B shows the protrusion as a pointed nub 54b, and FIG. 7C shows the protrusion as a "squared off" nub 54c.

Those skilled in this art will recognize that protrusions of other shapes may also be employed. In addition, in some embodiments the protrusions may be omitted entirely, or may be included with only one of the upper or lower flanges.

Because the cables 22' held by the grommet 50 may be of irregular cross-sectional shape, one of the characteristics of the grommet 50 that may be desirable in some embodiments is a sufficiently low hardness that the inner diameter of the grommet 50 can conform to the irregularities. However, employing a material of lower hardness may produce a grommet that is sufficiently soft that is ability to remain snugly within the cable hanger 20 is impaired. To address this, the grommet 50 may include "softening" apertures near the inner diameter that can effectively increase the "give" of the inner diameter of the grommet 50. Exemplary aperture patterns include a single ring of holes 60 (FIG. 8A), a series of elongate slots 62 (FIG. 8B) and multiple rings of staggered holes 64 (FIG. 8C). Other shapes, sizes and/or patterns of holes may also be employed, or the holes may be omitted in some embodiments.

FIG. 9A illustrates that the "softening" apertures 60, 62, 64 shown in the grommets 50 of FIGS. 8A-8C extend through the entire thickness of the grommet 50. In some embodiments, the softening apertures may extend through only a portion of the thickness of the grommet 50, with the result that the hardness of the inner diameter of the grommet 50 may vary along its thickness. FIG. 9B illustrates a grommet 50' with apertures 60' that extend only partially into the thickness of the grommet 50' such that a middle portion of the grommet 50' has no apertures, with the result that the upper and lower ends of the grommet 50' are effectively softer than the middle portion. FIG. 9C illustrates a grommet 50" with apertures 60" that also extend only partially into the thickness of the grommet 50", but such that the apertures 60" overlap in the middle portion of the grommet 50", with the result that the middle portion of the grommet 50" is softer than the ends. Other arrangements of apertures may also be employed, or in some embodiments the apertures may be omitted entirely.

FIGS. 10A and 10B illustrate a grommet 50''' that includes flexing apertures 65 at the central portion of the arc described by the "C" of the grommet 50'''. The flexing apertures 65 are positioned to enable the grommet 50''' to flex more easily due to the absence of material at the flexure location; thus, during the insertion of a cable 22' (as shown in FIG. 10B), the "arms" of the grommet 50''' can separate to facilitate the entry of the cable 22' into the grommet 50'''. Those of skill in this art will recognize that other sizes, shapes and/or patterns of flexing apertures may be employed, or flexing apertures may be omitted entirely.

Figure 12:
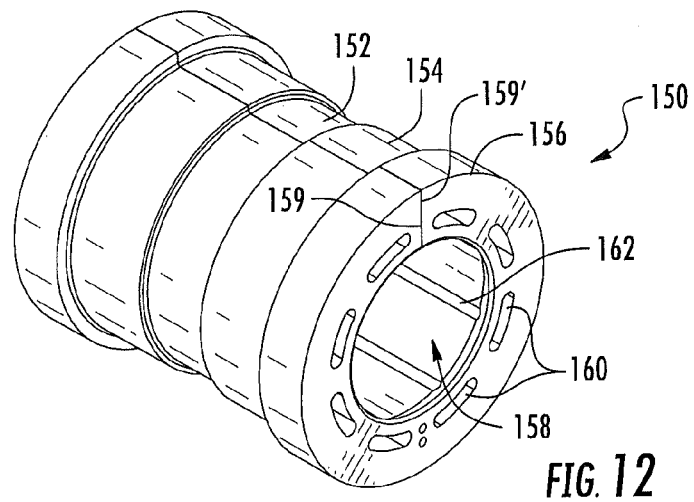
FIG. 12 is a perspective view of another grommet according to embodiments of the present invention.
Figure 13:
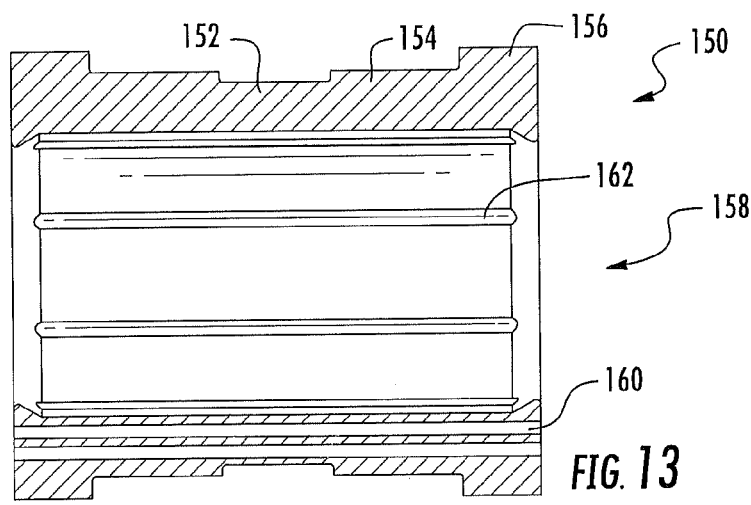
FIG. 13 is a longitudinal section view of the grommet of FIG. 12.

Another grommet according to embodiments of the invention is illustrated in FIGS. 12 and 13 and is designated broadly at 150. The grommet 150 has a stepped outer profile, with a central section 152, two intermediate sections 154, and two end sections 156; as can be seen in FIG. 13, the sections 152, 154, 156 have substantially the same inner diameter and form a cavity 158 that receives a cable. The stepped outer profile enables the grommet 150 to mate with a cable hanger (not shown) that grips the grommet 150 at the center section 152. As can be seen in FIGS. 12 and 13, the grommet 150 also includes elongate softening apertures 160.

Figure 14:
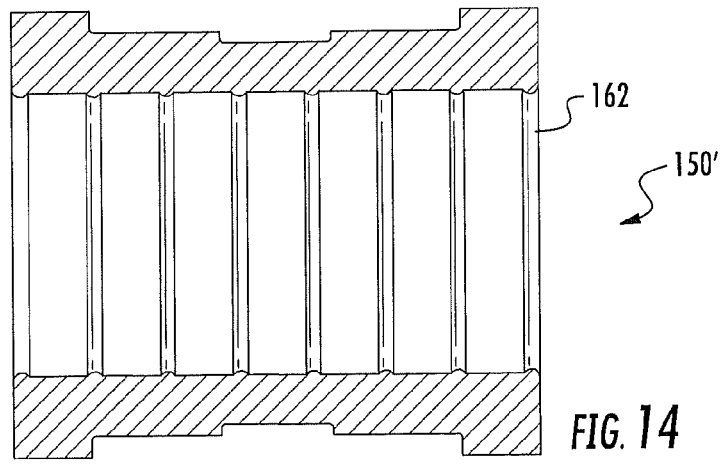
FIG. 14 is a longitudinal section view of another grommet according to alternative embodiments of the invention.

Further, as best seen in FIG. 13, the grommet 150 includes longitudinally-extending ribs 162 that protrude radially inwardly into the cavity 158. The ribs 162 can provide strength to the grommet 150 and can also provide additional gripping force for a cable received within the cavity 158. FIG. 14 illustrates a grommet 150' as an alternative embodiment that includes circumferential ribs 162'.

It should also be noted that, for manufacturing purposes, the grommets 150, 150' are formed such that their free ends 159, 159' touch; these are later split apart prior to receipt of a cable. As used herein, the term "generally C-shaped" is intended to encompass both the grommets of FIGS. 1-10, which have free ends that do no touch when the grommet is relaxed, and the grommets of FIGS. 12-14, which have free ends that can touch but that are separated in order to receive a cable. Also, the term "generally C-shaped" is intended to encompass both structures that are C-shaped throughout their length and structures that are C-shaped over only a portion of their length.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A grommet adapted for insertion into a cable hanger, comprising:
   a main body formed of a polymeric material, the main body having a generally C-shaped profile, the main body further having a length, a thickness and a longitudinal axis;
   wherein the main body includes a plurality of apertures extending generally parallel to the longitudinal axis of the main body, wherein at least some of the plurality of apertures extend less than the length of the main body.

2. The grommet defined in claim 1, wherein the plurality of apertures comprises a first set of apertures that extend into the main body from an upper surface of the main body and a second set of apertures that extend into the main body from a lower surface of the main body.

3. The grommet defined in claim 2, wherein the first set of apertures does not overlap with the second set of apertures.

4. The grommet defined in claim 2, wherein the first set of apertures overlaps with the second set of apertures.

5. The grommet defined in claim 1, wherein the apertures are non-circular in cross-section.

6. The grommet defined in claim 1, further comprising upper and lower flanges that extend radially outwardly from the main body, and wherein at least one of the upper and lower flanges includes a protrusion that extends radially inwardly.

7. The grommet defined in claim 1 in combination with a cable hanger, wherein the main body of the grommet resides in a cavity formed by the cable hanger.

8. The grommet and cable hanger defined in claim 7 in combination with a cable captured by the grommet, wherein the cable is selected from the group consisting of fiber optic cables and hybrid fiber/power cables.

* * * * *